United States Patent
Natkin et al.

(10) Patent No.: US 7,103,839 B1
(45) Date of Patent: Sep. 5, 2006

(54) TRACKING THE VALIDITY OF CACHE FRAMES IN DIGITAL MOVIE EDITING

(75) Inventors: Michael J. Natkin, Seattle, WA (US); David P. Simons, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1053 days.

(21) Appl. No.: 09/680,155

(22) Filed: Oct. 3, 2000

(51) Int. Cl.
    *G11B 27/00* (2006.01)
(52) U.S. Cl. ............... 715/723; 715/719; 715/726
(58) Field of Classification Search ........... 345/660, 345/724, 418, 700, 565, 760, 769, 723–725, 345/726, 731, 732; 348/135, 155; 715/719, 715/723, 726
    See application file for complete search history.

(56) References Cited

U.S. PATENT DOCUMENTS

| | | | | |
|---|---|---|---|---|
| 5,594,509 A | * | 1/1997 | Florin et al. ............... | 725/43 |
| 5,801,685 A | * | 9/1998 | Miller et al. ............. | 715/500.1 |
| 5,903,261 A | * | 5/1999 | Walsh et al. .............. | 345/418 |
| 5,969,755 A | * | 10/1999 | Courtney .................. | 348/143 |
| 5,999,173 A | * | 12/1999 | Ubillos .................... | 345/724 |
| 6,006,227 A | * | 12/1999 | Freeman et al. ............. | 707/7 |
| 6,078,005 A | * | 6/2000 | Kurakake et al. ......... | 84/477 R |
| 6,154,771 A | * | 11/2000 | Rangan et al. ............ | 345/660 |

* cited by examiner

*Primary Examiner*—Weilun Lo
*Assistant Examiner*—Truc T. Chuong
(74) *Attorney, Agent, or Firm*—Fish & Richardson P.C.

(57) ABSTRACT

Methods and apparatus, including computer program products, implementing and using techniques for determining validity of cached frames of a compositing hierarchy as a composition tree of a digital video composition is edited. The techniques use interval lists associated with nodes in a compositing tree to determine which cached frames of a composition hierarchy are guaranteed to be valid in the face of arbitrary edits to the hierarchy.

50 Claims, 7 Drawing Sheets

TRACKING THE VALIDITY OF CACHE FRAMES IN DIGITAL MOVIE EDITING

BACKGROUND

The invention relates to optimization of compositing in a digital system for creating and editing movies.

A movie composition, such as a digital video composition, is a sequence of frames, each frame containing data describing the audio and visual content of the frame. To render the composition, the frames are rendered and then output in their sequential order. Temporal changes in the composition are conveyed by the changing data in the sequence of output frames.

The present invention provides a useful framework for determining the validity of frames that have been cached in a movie rendering process, as well as for other purposes. To provide context for describing embodiments of the invention, the following paragraphs will describe the elements of an exemplary movie compositing and editing system.

In the system, a "composition" or "comp" is a single level of a compositing tree and is composed of one or more layers. Each layer has a defined in-point and out-point within the comp, which controls the times at which the image the layer defines first and last appears. The comp itself has a master timeline, ranging from time zero to a user set maximum, and the layers exist within this timeline. The root of the compositing tree is a comp. Rendering a comp generates a sequence of frames, each frame corresponding to a time interval on the comp's timeline determined by the frame rate.

A "layer" generally consists of an input source, which may be a still image, a moving image, or a comp, and a set of one or more masks, transformations, and effects that may be constant or time varying. In addition to representing footage, layers can also be used to represent cameras and lights in three-dimensional compositions.

The system performs "compositing". Compositing is the process of reading input still and moving image and graphics files, applying masking, geometric transformations and arbitrary effects, any of which may vary over time, and layering these images together using a number of predefined modes to produce a desired sequence of output images, such as might be used for video productions, movies, and video games. Any number of layers may be combined into a composition, which in turned can be used as the source of a layer in a parent composition, resulting in a hierarchical tree of operations, the above-mentioned compositing tree.

A node is one element in a compositing tree and can be a comp a layer, or an input source item, such as footage.

Generally, rendering a frame of a compositing tree is computationally expensive. Thus, movie compositing systems commonly cache frames for reuse. The goal of caching is to re-render a frame only if the cached frame has been invalidated by user edits, e.g., edits affecting the sources, parameters or structure of the composition tree. The present invention provides a novel framework and related techniques for validating cached frames.

Two standard approaches to caching are the push model and the pull model. In the push model, whenever an edit is made to the tree, the edited node and all nodes in the tree that depend on the edited node are recursively marked invalid. This has the advantage that when a frame is needed, it is known immediately whether the frame needs to be re-rendered. A disadvantage is the additional processing required during editing, which may slow down interaction with the user.

In the pull model, only the local node at which an edit is made is marked invalid when the edit is made, so that when it is time to render a frame, all of its sources must be checked recursively to determine whether they are valid. This gives constant-time performance during editing at the expense of increased cost at rendering time.

With either model, compositing systems commonly treat the validity of a node as time-invariant, i.e., either all of the cached frames of a comp or layer are valid, because none of their parameters or sources has changed, or they are all invalid, because something has been modified. This can be very costly for the user. For example, consider a user who has created and rendered 1000 frames of a comp that contains complex effects. It is not unusual for every frame to take ten seconds to render, so the full comp would take nearly three hours to render. If the user changes the color of one layer for ten frames in the middle of the comp, many existing compositing systems would require the user to re-render the entire comp from scratch. Some systems have a limited ability to invalidate individual cached frames based on editing. However, these systems use a manual form of caching, where it is up to the user to re-render invalid frames.

SUMMARY

This invention provides methods, and apparatus including computer program products, implementing and using techniques for determining which cached frames of a compositing hierarchy are valid when the compositing tree is edited. The present invention provides an efficient technique for determining the validity of a cached frame having a timestamp whose value is less than the current global timestamp, that is, for determining whether the frame may contain invalid data and therefore needs to be re-rendered, or conversely whether it is guaranteed to be valid.

The invention provides a system for tracking which cached frames of a compositing tree are guaranteed to be valid in the face of arbitrary edits to the tree. This system uses minimal amounts of memory, provides rapid answers to validity queries, and is flexible enough to handle a hierarchy with motion blur; stretched, offset, and remapped timelines; keyframed and expression-based parameter streams; effects that can make use of inputs at times other than the rendering time; and other arbitrary dependencies between nodes. In some complex situations, the system may be overly conservative and may indicate that a frame may be invalid when it fact it is valid, but it never reports that a frame is valid when it is invalid.

The invention can be implemented to realize one or more of the following advantages. A system implementing the invention can use a minimal amount of memory, provide rapid answers to validity queries, and can be flexible enough to handle a complex compositing tree. A system implementing the invention can efficiently determine the validity of individual cached frames instead of all cached frames of a node, while guaranteeing that no invalid frames are reused, in the context of a directed acyclic compositing hierarchy containing non-invertible time mapping between levels. A system implementing the invention can support pull-style caching so that validity is not just node-based, but time-based. A system implementing the invention can compactly and efficiently store cached-frame information.

The details of one or more embodiments of the invention are set forth in the accompanying drawings and the descrip-

DESCRIPTION OF DRAWINGS

Like reference symbols in the various drawings indicate like elements.

DETAILED DESCRIPTION

Rendering a compositing tree results in animation that runs over a period of time. Thus, each compositing tree has a corresponding timeline that starts at zero and runs for the entire period required for the rendering. Each event in the animation occurs when the frame depicting the event is rendered. Accordingly, a rendered frame generally corresponds to a particular time in the compositing tree's time line. However, a rendered frame may depend on source images and parameters of times other than the frame time. This may occur because of time stretching and re-mapping, non-zero time offsets for layers within a comp, effects that sample their inputs at times other than the current time, motion blur, expressions, and other arbitrary, non-local-time dependencies. Times are commonly represented as rational fractions of a second.

A "timestamp" (or, an "editing timestamp") is an integer defining the sequential position of an edit in a sequence of edits performed on the compositing tree. In a typical implementation, when an editor is first started, a global timestamp is set to zero and then incremented after each editing operation. A timestamp is completely different from a time.

The system records a timestamp for each cached frame to indicate the state of editing of the compositing hierarchy when the cached frame was rendered. Because each edit has a timestamp, if the timestamp of a cached frame is equal to or after the timestamp of an edit, the cached frame is necessarily valid with respect to the edit.

In some cases, a node in the hierarchy depends on a subset of the parameters of some other node. For example, in the normal case, changing the name of a layer in a comp would not require the comp to re-render, as the change of name would have no effect on the output pixels of that comp at any frame. However, if an expression on some layer looks up another layer by name and uses its parameters, changing the name may in fact affect the output pixels. In one implementation, these dependent expressions or "collateral dependencies" are essentially pointers to parameters. There are at least two types of collateral dependencies, expression dependencies, which can point anywhere, and layer parameter dependencies, which points only to layers within the same comp. The latter affect only post-effect caches.

Figure 1A:
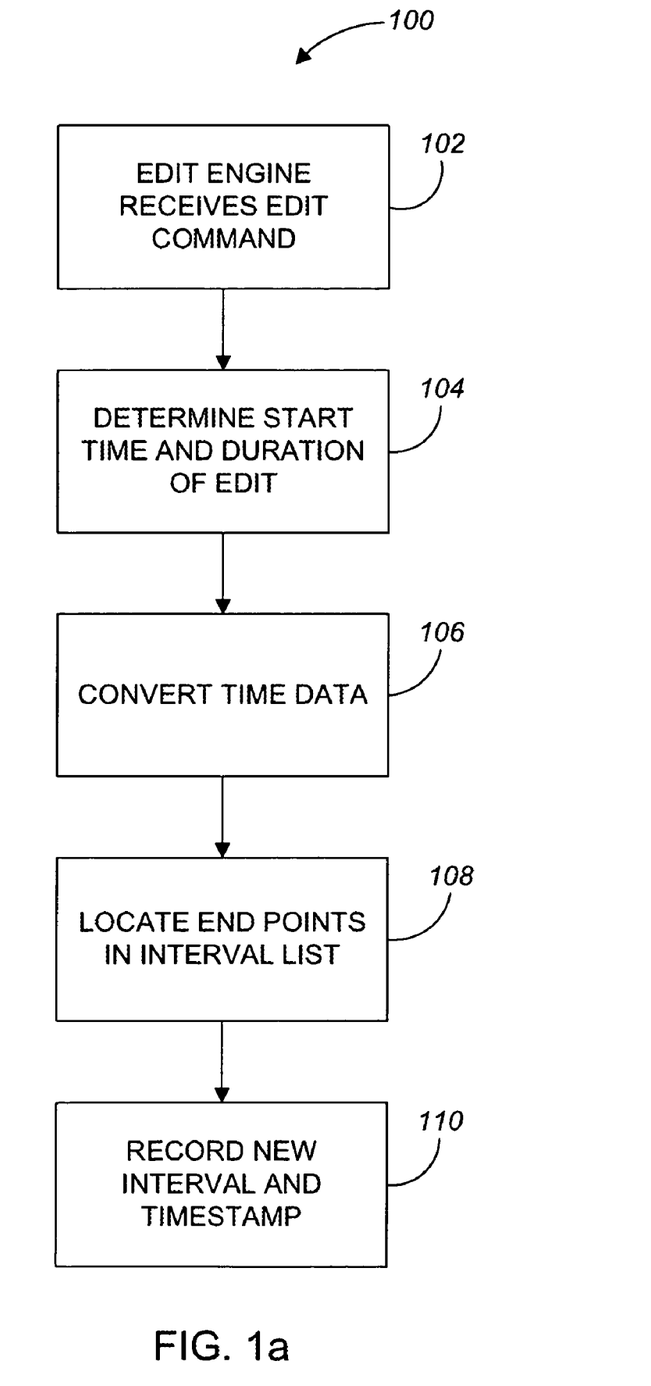
FIG. 1a is a flowchart of a method for updating cached frames in accordance with the invention.
Figures 1B, 1C:
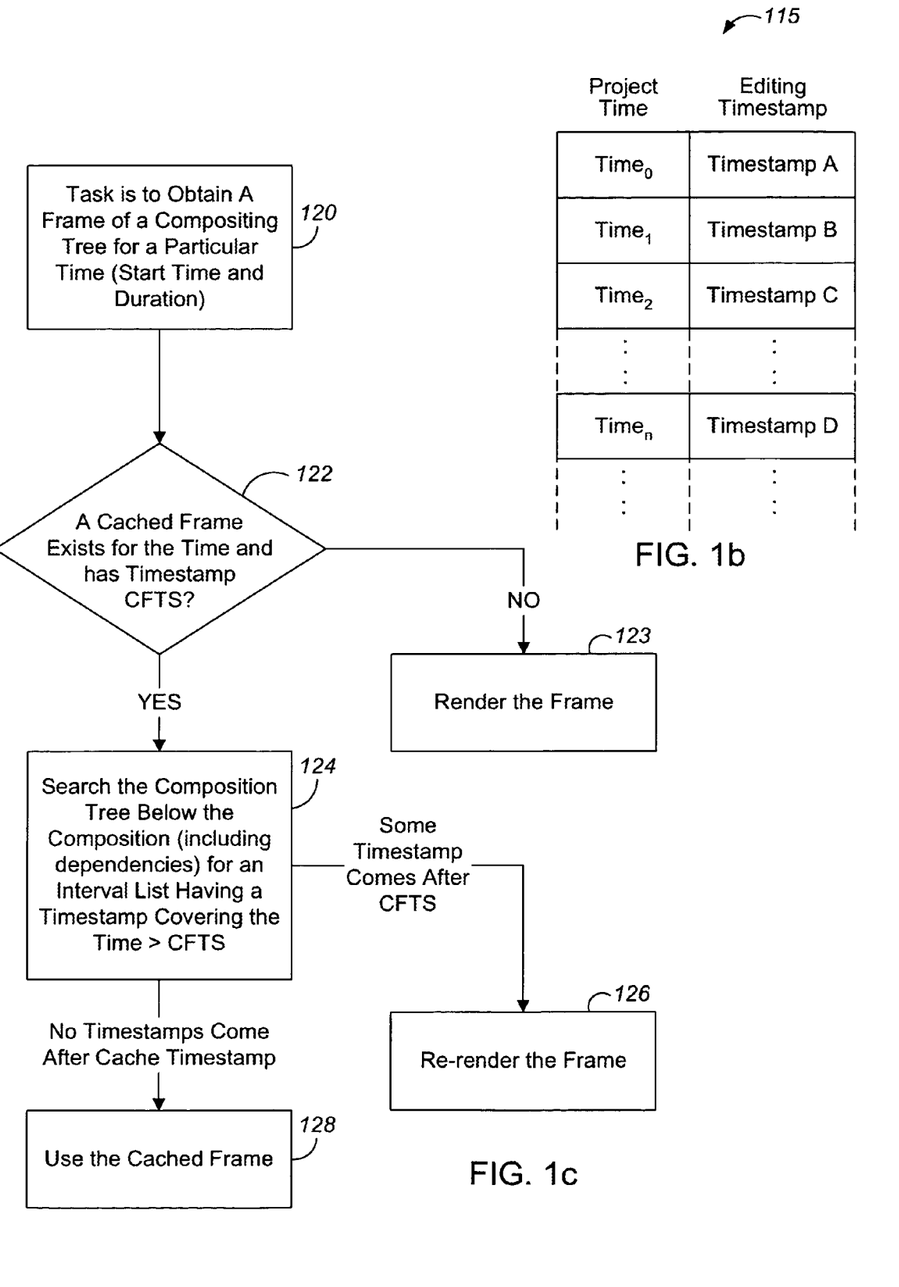
FIG. 1b is an illustration of an interval list's data structure.
FIG. 1c is a flow chart of a method of validating cached frames in accordance with the invention.

As shown in FIGS. 1a–c, a method for tracking cached frames employs a data structure that will be called an interval list, instances of which are attached to compositing tree nodes, and a series of algorithms for updating interval lists on the tree as edits are made. In this implementation, reception of an editing command causes an edit engine to update the affected interval lists. The interval lists are queried when the system needs to determine whether a cached frame is valid or needs to be re-rendered.

In one implementation, each interval list maintains a series of ranges of times, each with an associated timestamp. As shown in FIG. 1a, when an editing command is performed by the editing engine of the system on a layer or comp (step 102), the editing engine updates the local interval list or lists over a range corresponding to the maximum range of time that could be invalidated by that change. An interval list is local if it is associated with or linked to the node of the tree immediately affected by the editing. In general, a node will have multiple local lists so that different kinds of editing effects can be tracked separately. The editing engine determines which list or lists to update by the command that it performs. The mapping of editing command to list identities can be defined by a simple table.

The interval list records intervals in a compact form. In one implementation, interval lists are implemented as a C++ object. As shown in FIG. 1b, this implementation of an interval list (item 110) represents a set of intervals as two parallel arrays. The first array contains times, and each element is always larger than its previous neighbor. Although times in compositing programs are usually rational ratios, the denominator of these ratios is generally consistent within an individual layer or comp. Therefore, this denominator is stored as a single value, and the entries in the list consist only of the numerator. When an edit time's denominator does not match that of the list, it is converted conservatively to the nearest matching fraction with the list's denominator. In one implementation, to be conservative, the start times are rounded down to the nearest multiple of the denominator and end times are rounded up. The second array contains timestamps, representing the latest timestamp at which that interval has been edited. Each pair of corresponding elements of the arrays defines a (time, timestamp) pair that represents a period of time running from that time, inclusive, through the time of the next pair, exclusive. In other words, it represents an half-open interval of time, closed on the left. The last pair represents all time from its time out to the maximum representable time. The arrays are maintained so that there is a single, known timestamp for all possible times. This condition is met by initializing the arrays such that the first entry contains the maximally negative (earliest) possible time, and the special 'invalid' timestamp, which is guaranteed to be effectively later than any queried timestamp. No subsequent operations disturb the time of this initial entry, so all of time is guaranteed to be covered.

Referring to FIG. 1a, a request to update an interval list by adding an interval contains three parameters: the start time of the edit, the duration of the edit, and the value of the global timestamp when the edit was performed. These parameters define a half-open interval of time, like the interval list entries, and a corresponding timestamp.

The range of time affected by an edit is determined (step 104). This time range is specified by the start time and duration. Many different types of edits can be performed on the compositing hierarchy. Most of them correspond to fairly obvious ranges of times. For example, if a new layer is added to a comp, the layer is initially invalid over its entire range, and therefore the comp is invalid from the in-point of the layer to its out-point.

When a layer is moved in time (its duration remains the same, but it now covers a different section of the comp), the layer itself becomes invalid over its entire range, because the frames that it provides for compositing at a particular time in the comp will each be different. The range of time where the layer previously existed in the comp must also be invalidated, because those frames previously included the layer's pixels but no longer do so. It is insufficient to invalidate the layer over that time span, because it no longer exists there, and the parent comp will not query it when considering cached copies of those frames. Therefore, in these cases, it is necessary to invalidate the parent comp over the old time range.

When the value of a keyframe for a layer (such as a position, masking, opacity, or effect parameter) at a particular time is altered, the range of time invalidated is usually less than the entire range of time of the layer. In the simplest case, where all of the keyframes use linear interpolation, the alteration invalidates the range of time from the keyframe prior to the one being modified through the keyframe immediately following it. In more complex cases, such as auto-Bezier interpolation, the range invalidated will be two keyframes left and right because the tangent information over a range of four keyframes is used to determine interpolated values. Similar considerations apply when a keyframe is inserted, removed or when its interpolation type is changed. If the property is spatial and makes use of features such as are described in U.S. Pat. No. 5,929,867 for Floating Keyframes, a larger range may be invalidated because changing one keyframe will cause others to move in time to achieve uniform spatial speed. If a property has no keyframes (e.g., it has only a single value used over all of time), then when that property is changed, the layer is invalidated over its entire range.

The start time, duration, and timestamp of an edit are converted for storage in the interval list in accordance with the above discussion in reference to FIG. 1b (step 106).

Each of the two end points is then located in the interval list (step 108). A binary search technique can be used for this purpose. Either end point may fall at the beginning of an existing interval or in the middle. The pair may be exactly aligned with an existing interval, fall in two adjacent intervals, or be separated by an arbitrary number of other intervals. These various cases may result in a new interval being added, old intervals being split, or old intervals being combined. A special sentinel value may be passed for the start time to indicate that the entire range of time of the object (layer or comp) is invalid. This happens in the case of many global types of edits, such as changing the rendering quality of a layer, or the frame rate of a comp. In these cases, the interval list is trivially reset to its default initial state.

The new interval and its time stamp are recorded in the interval list in accordance to the above discussion in reference to FIG. 1b (step 110).

As shown in FIG. 1c, when a frame is later requested from the edited layer or comp, the system queries the interval lists for the range of time covered by that frame and compares it with the timestamp of a cached frame to determine whether the cached frame is valid or must be re-rendered. For example, if the system needs to obtain a particular frame of a compositing tree for a particular time in the animation timeline, the system determines if the frame is cached (decision step 122). If not, then the system renders the frame (step 123). If there is a cached version of the desired frame, then the system recursively searches the appropriate interval lists on the compositing tree to validate the cached version of the desired frame (step 124). A cached frame is considered valid unless its timestamp (a cached-frame timestamp or CFTS) is earlier than the timestamp of some interval in interval lists local to the node of the desired frame. If the search yields no interval timestamp later than the CFTS, then the cached frame is used (step 128).

In this implementation, the back end database of the application caches frames from two types of location in a composition tree. Multiple frames of the output of a comp are cached and each layer is cached. Layers are cached in a state representing the source pixels after the layers have been masked and effects have been applied, but before geometric transforms, lighting, and shading have been applied. This caching is referred to as the Post-Effect Cache or PFC. This feature allows the user to modify the geometric transform of a layer without incurring the cost of unnecessarily re-rendering the effects.

Comp and layer nodes have multiple interval lists, each representing time intervals and timestamps corresponding to editing operations that affect a particular subset of caches in a compositing tree. For example, operations such as translating and rotating a layer are grouped into an interval list for the layer because each operation causes corresponding cached frames of the parent comp to re-render, but not the PFC of the layer (unless the layer has a collateral dependency on the transformation). Having interval lists for different editing operation permits the compositing system to track individual frames of a node. Consequently, the compositing system advantageously has to re-render only some rather than all of the cached frames that depend on parameters of a node. For example, if a layer with effects described in the preceding paragraph is rotated, the PFC does not to be re-rendered. Only the comp needs to be recomposited using the pre-existing PFCs of each layer. The layer effects, assuming there is a corresponding PFC, do not need to be rendered. Furthermore, grouping the hundreds of types of edit into a small number of interval lists saves storage space while advantageously permitting the tracking of individual frames of a node as discussed above. For example, if a layer is rotated and translated, the system needs to check only a single interval list to determine whether the cached frame of the layer is valid. However, if the translate and rotate operations each had an interval list, then the system would have to check them both to validate a cached comp frame. Furthermore, there may occasionally be a cached frame that depends only on the translation and not the rotation because of collateral expression dependencies. This implementation groups these edit types into a single interval list.

The system has separate routines for the different levels at which frames are cached. Each routine specifies which interval lists to check. For example, if the system is determining the validity of a PFC, then only interval lists corresponding to editing operations that affect the masking and effects of a layer are considered. Interval lists affecting the geometric transforms of the layer but not its effects are not checked unless there are collateral dependencies requiring their checking.

Each comp and layer can have more than one interval list. For example, some layers have effects that depend on the source image of others layers. To support this, each layer has a separate interval list that corresponds to changes that affect those effects, such as replacing a layer's source, or moving it in time. Additionally, in instances when layer effects are applied before transformations, the system maintains a single frame cache that represents the results of applying the effects at the most recently rendered frame. Separate interval lists help to distinguish those edits that affect this per-frame cache (which may be expensive to re-render because some effects are very slow) from those that affect the transformation, thus allowing the system to re-render the transformation and the comp but not the layer's effects. Thus, in the recursion referenced above and described in detail below, more than one interval list may be searched at each node.

FIGS. 2 through 6 are flowcharts of methods to retrieve valid cached frames of a compositing tree. The compositing system recursively searches interval lists at the composition and the layer levels. The appropriate interval lists are queried and given the start time and duration (which may need conservative conversion) of a requested frame. The query interval need not correspond exactly to any of the intervals in an interval list. The start interval and end interval in which the query start and end endpoints respectively fall are located in the interval list, by using a binary search, for example. Then the intervals from the start interval to the end interval are examined and the largest timestamp encountered in any of those intervals is returned.

Figure 2:
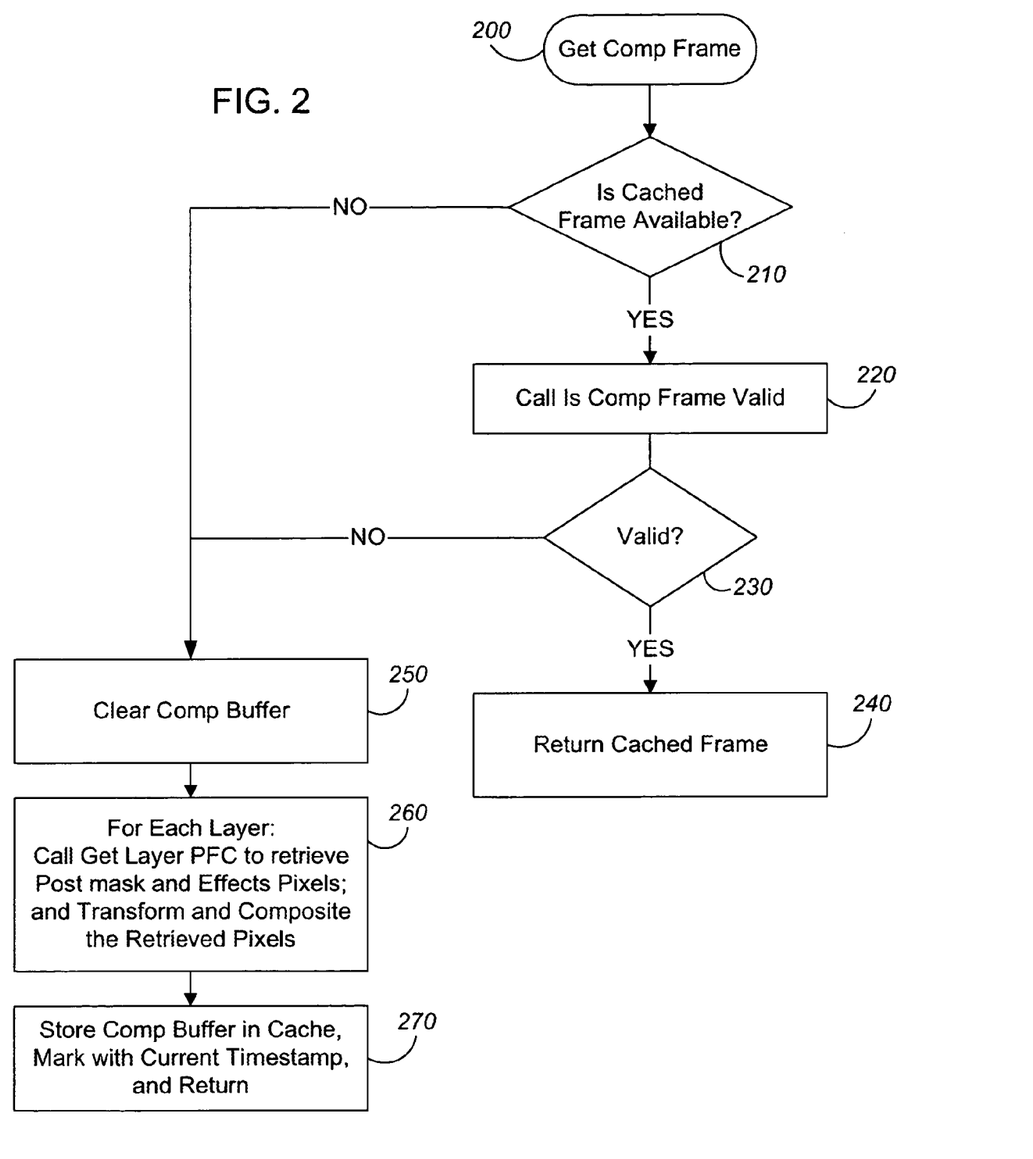
FIG. 2 is a flowchart of a method for retrieving a valid comp frame.

To see how interval list queries are used to decide the validity of a cached frame, consider, for example, that the system is called upon to render a frame at time T, and finds that a cached copy exists whose timestamp is M. If motion blur is not in use, the system will query the interval list with start time=T and duration equal to the comp's frame duration=D. (If motion blur is in use, that range will be expanded to included the full range of time at which the shutter is open, which may include time before or after the actual frame). FIG. 2 is a flow diagram of a method 200 of retrieving a comp frame. First, the system checks whether a cached comp frame is available (step 210). Then, the appropriate local interval lists of the comp are queried by calling a routine (e.g., process 400 of FIG. 4) for determining the validity of a comp frame (step 220). If the query returns a timestamp greater than M, the system knows immediately that the frame must be re-rendered (decision 230, and steps 250, 260, and 270), and no further queries are done. To re-render, the system clears the comp buffer (step 250) and calls a routine that retrieves the post mask and effects pixels (e.g., process 300 of FIG. 3). The system then transforms and composites the retrieved pixels (step 260). Additionally, the system caches the results and marks the result with the current timestamp (step 270). However, the if called routine validates the cached comp frame by returning a "YES," process 200 causes the system to return the cached frame (step 240).

Figure 3:
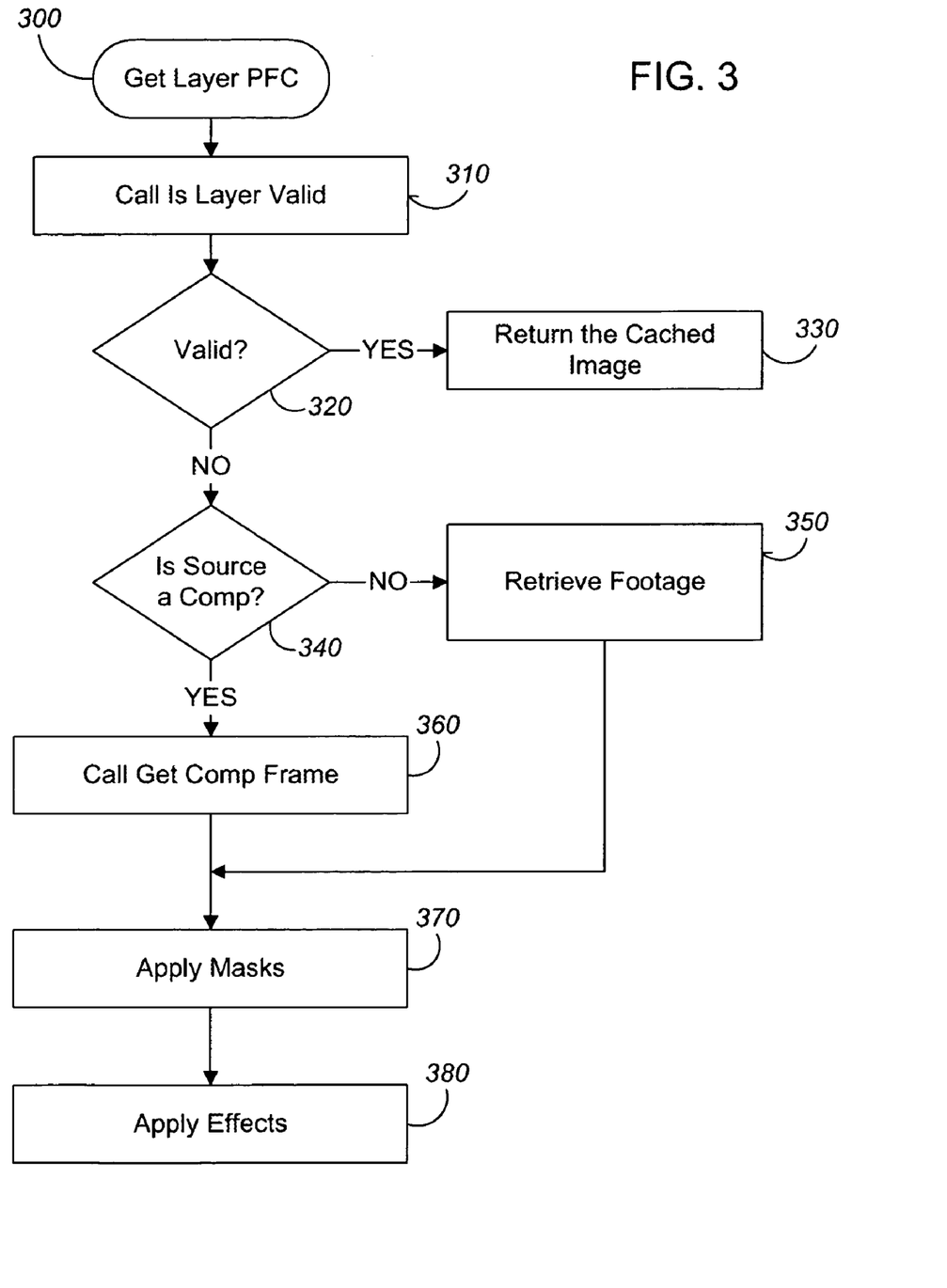
FIG. 3 is a flowchart of a method for retrieving a valid layer PFC.
Figure 5:
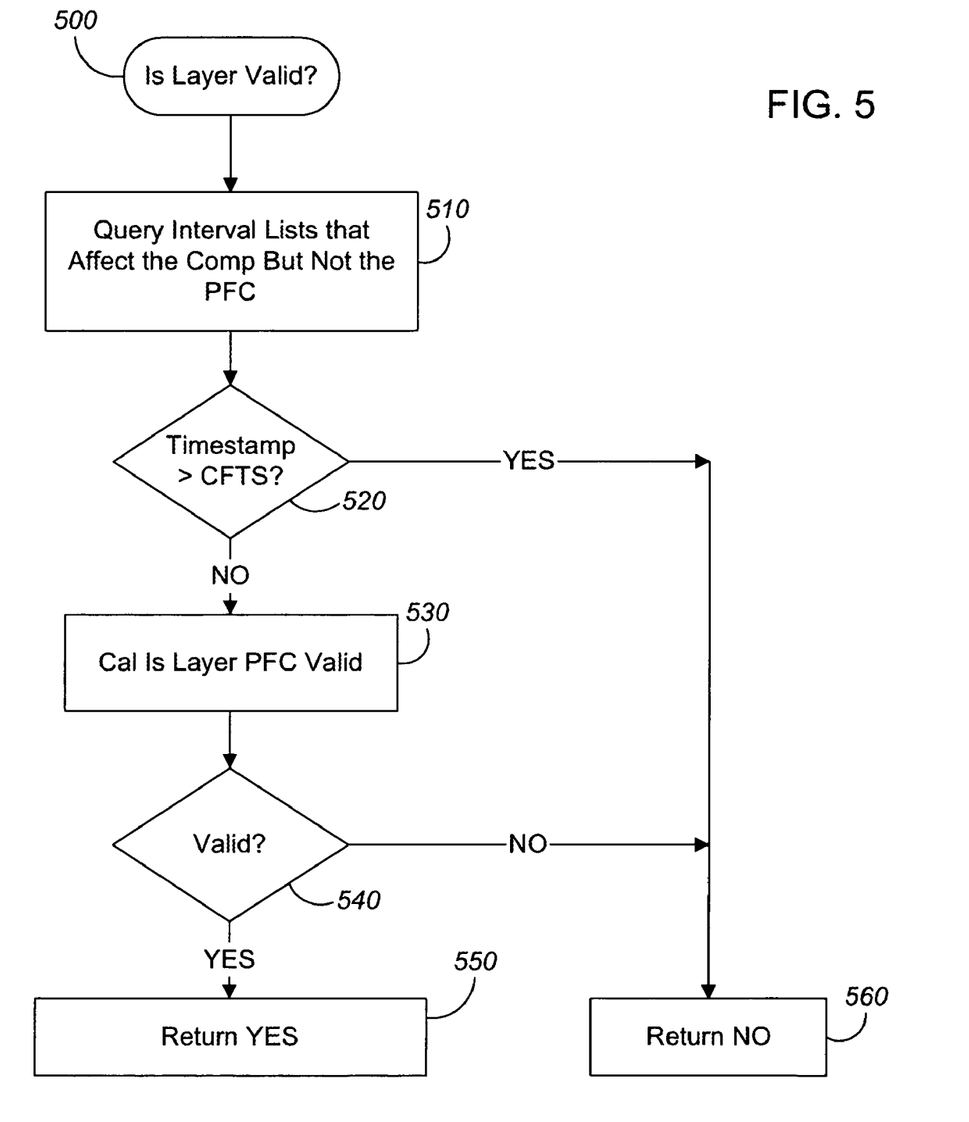
FIG. 5 is a flowchart of a method for determining the validity of a layer.

As shown in FIG. 3, to retrieve the post mask and effects pixels, the system calls a routine for determining the validity of the layer such as process 500 of FIG. 5 (step 310). If the called routine determines that the layer is valid and returns a "YES" (decision 320), then process 300 returns the cached image (step 330). If the called routine determines that the layer is invalid and returns a "NO," then the system re-renders (steps 360–380). To ren-render, the system determines if the source of the layer is a comp (decision 340). If the source is not a comp, then it is footage and the system retrieves the footage. The system applies masks and effects to the retrieved footage (steps 370 and 380). If the source is a comp, then the system calls a routine to retrieve the comp frame such as process 200 of FIG. 2 (step 360). The system applies masks and effects to the retrieved comp frame.

Figure 4:
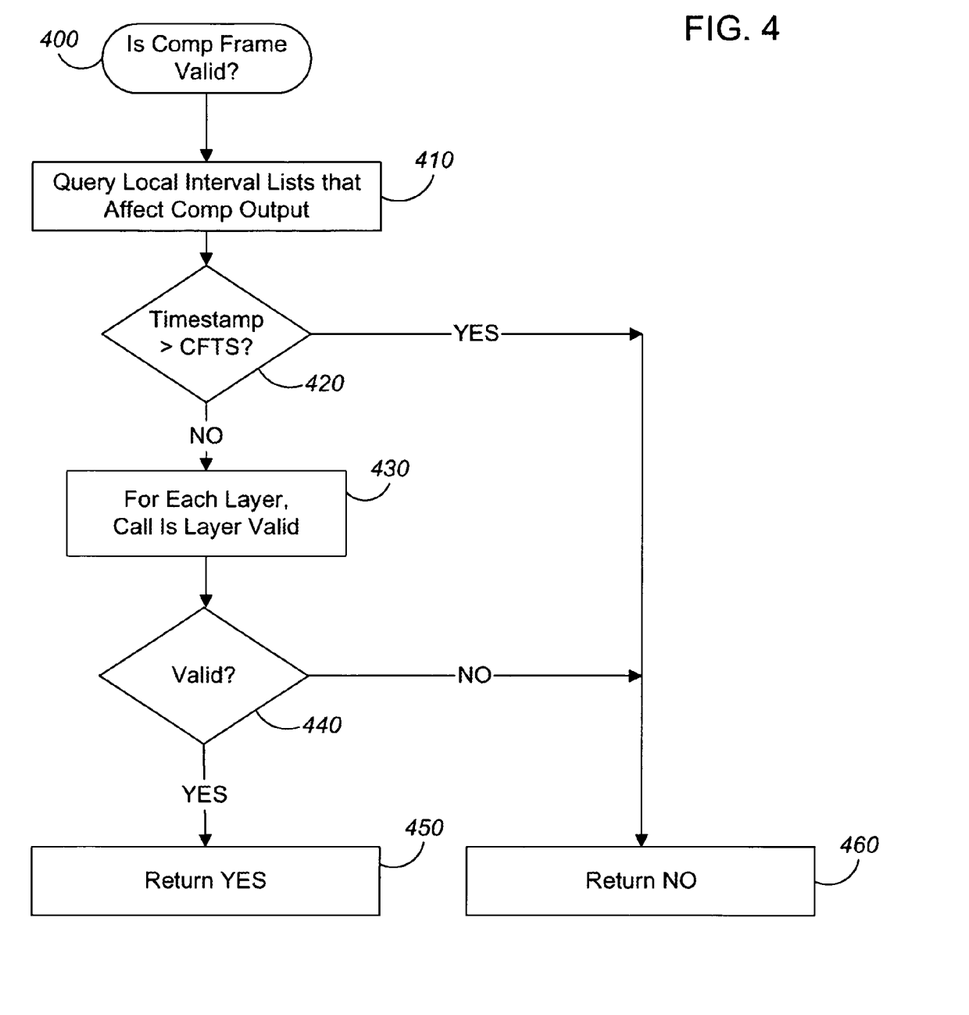
FIG. 4 is a flowchart of a method for determining the validity of a comp frame.

As shown in FIG. 4, in determining the validity of a comp frame, the system first queries the interval lists that affect comp output, i.e., those that directly affect comp pixels (step 410 and decision 420). If the cached frame timestamp is earlier than the corresponding timestamps in the interval lists queried, then the cached frame is invalid and the process returns a "NO" (step 460), thereby causing the system to re-render the frame in question. However, if the cached frame timestamp is not earlier than the corresponding timestamps, then the process checks each of the layers that are active at time T (step 430 and decision 440). This check is done for each layer by calling a routine such as process 500 of FIG. 5 (step 430). However, comp time T and duration D may not correspond to the same times in the layer, because the layer may be shifted and scaled in time. In this implementation, the interval (T, D) is mapped by the layer's time parameters. If the called routine returns a "YES," thus validating the comp frame, process 400 returns a "YES" (step 450), thus in turn causing the system to use the valid cached comp frame. If the called routine returns a "NO," thus invalidating the cached comp frame, process 400 returns a "NO" (step 460), causing the system to re-render.

As shown in FIG. 5, the time parameters are checked against the local interval lists that do not affect the PFC (step 510). If the cached frame timestamp is earlier than the corresponding timestamps in the interval lists queried, then the system ends the query and returns a "NO" (decision 520 and step 560), causing the system to begin re-rendering. Otherwise, the system must recursively process the layer's sources by calling a routine such as process 600 of FIG. 6 (steps 530 and decision 540), which again may involve a time re-mapping, and the source may in turn be a comp, which would require further recursion. If the called routine returns a "YES," then process 500 also returns a "yes" (step 550). Otherwise, the layer is invalid and process 500 returns a "NO" (step 560).

Figure 6:
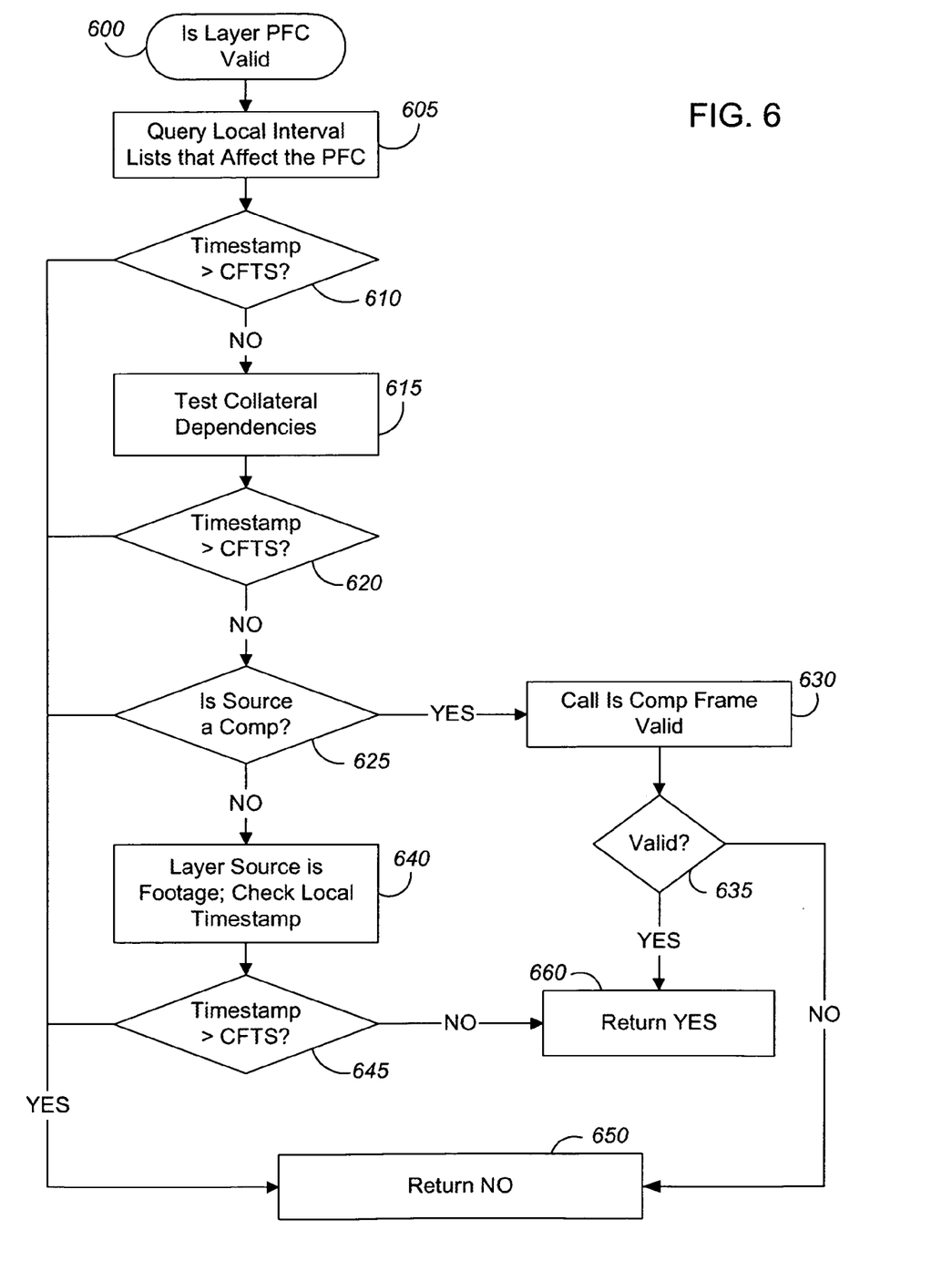
FIG. 6 is a flowchart of a method for determining the validity of a layer PFC.

As shown in FIG. 6, the system queries the local interval lists that affect the PFC (step 605 and decision 610). If the system finds a timestamp later than the cached frame timestamp, the layer is invalid and process 600 returns a "NO" (step 650). Otherwise, the system checks collateral dependencies of the layer (step 615 and decision 620). If a timestamp later than the cached frame timestamp is found here, the layer is invalid and the process returns a "NO" (step 650). However, if no later timestamps are found, the system checks whether the layer source is a comp or a footage (decision 625). If the source is footage, which has a single timestamp instead of an interval list, then the system simply compares the cached frame timestamp to the footage timestamp (step 640 and decision 645). If the footage timestamp is later than the cached frame timestamp, then the system return a "NO" (step 650). Otherwise, the system returns a "YES" (step 660). If the layer source is a comp, then the system calls a routine such as process 400 of FIG. 4 to determine the validity of the comp (step 630). If the comp is valid (decision 635), then the system returns a "YES" (step 660). Additionally, the system searches interval lists of collateral dependencies because changes to a collateral dependency affect the dependent layer. Each active layer of the original comp is checked in this way. If at the end of the recursion no later timestamps are found, the system may safely assume that the cached comp frame is up to date and may be used. Note that although the comp the system originally started with may be out of date and need re-rendering, one or more of its input nodes may be up to date, and their cached frames can be used in computing the final comp, thereby saving time.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product, tangibly stored on a computer-readable medium, for calculating the validity of a cached frame of a movie in a movie compositing system, comprising instructions operable to cause a programmable processor to:

maintain a global editing timestamp that is updated with each editing operation performed by the system, the global editing timestamp representing an edit sequence position in a sequence of edits made to the movie;

establish an interval list for each node in a compositing tree defining a movie, each node having a timeline that maps to a master timeline of the movie, an interval list for a node including, for each interval in the node's timeline, a single editing timestamp;

update the interval list for a node when the node is edited; and use the interval list for a first node to evaluate the validity of a cached frame for a particular interval of the master timeline, the cached frame having been produced by compositing the first node in the compositing tree, the evaluation being performed by (a) comparing (i) an editing timestamp associated with the cached frame with (ii) the editing timestamps of intervals in the interval list that map to at least a portion of the interval of the master timeline, and (b) treating the cached frame as invalid if any of the intervals' editing timestamps is later than the editing timestamp associated with the cached frame.

2. The product of claim 1, further comprising instructions to:

use the interval lists of all nodes below the first node in the tree to evaluate the validity of the cached frame.

3. The product of claim 1, wherein:

updating the global timestamp comprises incrementing the global timestamp; and the interval list is stored as a series of pairs (interval, timestamp), the series being sorted by the intervals.

4. The product of claim 3, wherein:

the series of (interval, timestamp) pairs are sorted in ascending order of intervals.

5. A computer program product, tangibly stored on a machine-readable medium, for displaying a frame of a movie composition, the product comprising instructions operable to cause a programmable processor to:

associate edit sequence information with an element of the movie composition, the edit sequence information specifying, for an interval of the element's timeline, an edit sequence position representing the position in a sequence of edits made to the movie composition of a most recent edit made that affects the element during the interval, the interval being a portion of the timeline;

when caching a frame, associate with the cached frame an edit sequence position that represents a state of editing of the movie composition; and when displaying the frame, compare the edit sequence position associated with the cached frame with edit sequence information associated with the element.

6. The product of claim 5, wherein:

the edit sequence position that represents a state of editing of the movie composition includes the edit sequence position of a most recent edit made to the movie composition.

7. The product of claim 5, further comprising instructions to:

in response to an edit made to the movie composition, update the edit sequence information.

8. The product of claim 7, wherein:

the instructions to compare include instructions to compare the sequence position associated with the cached frame with the updated sequence information.

9. The product of claim 5, further comprising instructions to:

for an edit made to the movie composition, identify an interval of the element's corresponding timeline that may be affected by the edit.

10. The product of claim 9, wherein:

the identified interval is the maximum range during which the edit may affect the element.

11. The product of claim 5, further comprising instructions to:

for an edit made, identify an interval of the element's corresponding timeline that is affected by the edit.

12. The product of claim 5, wherein instructions to compare include instructions to:

identify the edit sequence position of the most recent edit from the sequence information associated with the element; and compare the edit sequence position associated with the cached frame with the identified edit sequence position.

13. The product of claim 5, wherein the sequence information associated with the element is placed into groups, the product further comprising instructions to:

identify the most recent edit sequence information for each group.

14. The product of claim 5, wherein:

the edit sequence information includes an interval list, the interval list specifying, for each interval of the element's timeline, the edit sequence position representing a position in a sequence of edits made to the composition of a most recent edit made that affects the element during the interval.

15. The product of claim 14, wherein:

each interval of the interval list includes a start time; and except for the last listed interval of the interval list, each interval of the interval list is delimited by its start time and the start time of the subsequent interval.

16. The product of claim 15, wherein:

the movie composition has a master timeline to which the element's timeline maps, the master time line including a start time and a stop time;

the first interval listed in the element's interval list has a start time that precedes the start time of the composition's master timeline; and the last interval listed in the element's interval list extends beyond the stop time of the composition's master timeline.

17. The product of claim 15, further comprising instructions to:

for an edit, determine the start time and duration of an interval when the edit may affect the element, and define new intervals in the interval list if the interval list does not include an interval having the start time and duration of the determined interval, the new intervals being defined based on the start time and the duration of the determined interval.

18. The product of claim 17, wherein:

the instructions to define new intervals include instructions to define new intervals such that the intervals in the interval list do not overlap.

19. The product of claim 17, further comprising:
associate the edit sequence position of the edit with the determined interval.

20. The product of claim 15, wherein:
the edit sequence position is represented by an integer.

21. The product of claim 20, wherein:
the interval list of an element includes a first array and a second array that is parallel to the first array, the first array including start times and the second array including integers representing edit sequence positions.

22. The product of claim 14, further comprising instructions to:
when displaying the frame, identify the interval of the interval list that affects the frame and compare the edit sequence position associated with the cached frame with the edit sequence position listed in the interval list for the identified interval.

23. The product of claim 14, further comprising instructions to:
maintain a first interval list for a first type of type of edits and a second interval list for a second type of edits.

24. The product of claim 23, further comprising instructions to:
in response to an edit to the composition, identify one or more interval lists to update; and
update the identified interval lists.

25. The product of claim 5, wherein:
the element is a first element and the movie composition includes multiple elements; and
the elements of the movie composition are nodes in a compositing tree, a parent node in the compositing tree being affected by changes to a child node in the compositing tree, the product further comprising instructions to:
when displaying the frame, identify one or more elements that are child nodes of the first element, the instructions to compare including instructions to compare the edit sequence position associated with the cached frame with the edit sequence information associated with the one or more elements identified as child nodes of the first element.

26. The product of claim 5, wherein:
the element is a first element and the movie composition includes multiple elements; and
the first element collaterally depends and one or more other elements in the movie composition, an element that is collaterally dependent on another element being affected by the other element, the product further comprising instructions to:
when displaying the frame, identify one or more elements on which the first element collaterally depends, the instructions to compare includes instructions to compare the edit sequence position associated with the cached frame to the edit sequence information associated with the one or more identified elements.

27. The product of claim 5, further comprising instructions to:
validate the cached frame when the edit sequence position associated with the cached frame specifies an edit that is as or more recent than an edit specified by the current edit sequence position specified recent as by the edit sequence information for the interval of the element's timeline.

28. A method for displaying a frame of a movie composition, the method comprising:
associating edit sequence information with an element of the movie composition, the edit sequence information specifying, for an interval of the element's timeline, an edit sequence position representing the position in a sequence of edits made to the movie composition of a most recent edit made that affects the element during the interval, the interval being a portion of the timeline;
when caching a frame, associating with the cached frame an edit sequence position that represents a state of editing of the movie composition; and
when displaying the frame, comparing the edit sequence position associated with the cached frame with edit sequence information associated with the element.

29. The method of claim 28, wherein:
the edit sequence position that represents a state of editing of the movie composition includes the edit sequence position of a most recent edit made to the movie composition.

30. The method of claim 28, further comprising:
in response to an edit made to the movie composition, updating the edit sequence information.

31. The method of claim 30, wherein:
the instructions to compare include instructions to compare the sequence position associated with the cached frame with the updated sequence information.

32. The method of claim 28, further comprising:
for an edit made to the movie composition, identifying an interval of the element's corresponding timeline that may be affected by the edit.

33. The method of claim 32, wherein:
the identified interval is the maximum range during which the edit may affect the element.

34. The method of claim 28, further comprising:
for an edit made, identifying an interval of the element's corresponding timeline that is affected by the edit.

35. The method of claim 28, wherein comparing includes:
identifying the edit sequence position of the most recent edit from the sequence information associated with the element; and
comparing the edit sequence position associated with the cached frame with the identified edit sequence position.

36. The method of claim 28, wherein the sequence information associated with the element is placed into groups, the method further comprising:
identifying the most recent edit sequence information for each group.

37. The method of claim 28, wherein:
the edit sequence information includes an interval list, the interval list specifying, for each interval of the element's timeline, the edit sequence position representing a position in a sequence of edits made to the composition of a most recent edit made that affects the element during the interval.

38. The method of claim 37, wherein:
each interval of the interval list includes a start time; and
except for the last listed interval of the interval list, each interval of the interval list is delimited by its start time and the start time of the subsequent interval.

39. The method of claim 38, wherein:
the movie composition has a master timeline to which the element's timeline maps, the master time line including a start time and a stop time;
the first interval listed in the element's interval list has a start time that precedes the start time of the composition's master timeline; and
the last interval listed in the element's interval list extends beyond the stop time of the composition's master timeline.

40. The method of claim 38, further comprising:

for an edit, determining the start time and duration of an interval when the edit may affect the element, and define new intervals in the interval list if the interval list does not include an interval having the start time and duration of the determined interval, the new intervals being defined based on the start time and the duration of the determined interval.

41. The method of claim 40, wherein:

defining new intervals include defining new intervals such that the intervals in the interval list do not overlap.

42. The method of claim 40, further comprising:

associating the edit sequence position of the edit with the determined interval.

43. The method of claim 38, wherein:

the edit sequence position is represented by an integer.

44. The method of claim 43, wherein:

the interval list of an element includes a first array and a second array that is parallel to the first array, the first array including start times and the second array including integers representing edit sequence positions.

45. The method of claim 37, further comprising:

when displaying the frame, identifying the interval of the interval list that affects the frame and compare the edit sequence position associated with the cached frame with the edit sequence position listed in the interval list for the identified interval.

46. The method of claim 37, further comprising:

maintaining a first interval list for a first type of type of edits and a second interval list for a second type of edits.

47. The method of claim 46, further comprising:

in response to an edit to the composition, identifying one or more interval lists to update; and update the identified interval lists.

48. The method of claim 28, wherein:

the element is a first element and the movie composition includes multiple elements; and the elements of the movie composition are nodes in a compositing tree, a parent node in the compositing tree being affected by changes to a child node in the compositing tree, the method further comprising:

when displaying the frame, identifying one or more elements that are child nodes of the first element, the step of comparing including comparing the edit sequence position associated with the cached frame with the edit sequence information associated with the one or more elements identified as child nodes of the first element.

49. The method of claim 28, wherein:

the element is a first element and the movie composition includes multiple elements; and the first element collaterally depends and one or more other elements in the movie composition, an element that is collaterally dependent on another element being affected by the other element, the method further comprising:

when displaying the frame, identifying one or more elements on which the first element collaterally depends, the step of comparing includes comparing the edit sequence position associated with the cached frame to the edit sequence information associated with the one or more identified elements.

50. The method of claim 28, further comprising:

validating the cached frame when the edit sequence position associated with the cached frame specifies an edit that is as or more recent than an edit specified by the current edit sequence position specified recent as by the edit sequence information for the interval of the element's timeline.

* * * * *

UNITED STATES PATENT AND TRADEMARK OFFICE
CERTIFICATE OF CORRECTION

PATENT NO. : 7,103,839 B1
APPLICATION NO. : 09/680155
DATED : September 5, 2006
INVENTOR(S) : Michael Natkin and David P. Simons It is certified that error appears in the above-identified patent and that said Letters Patent is hereby corrected as shown below:

Column 10, line 47, delete "time line" and replace with --timeline--;
Column 11, line 1, delete "comprising" and replace with --comprising instructions to--;
           line 20, delete "of type";
           line 45, delete "and" and replace with --on--;
Column 13, line 29, delete "of type";
Column 14, line 18, delete "and" and replace with --on--.

Signed and Sealed this

Twenty-sixth Day of December, 2006

JON W. DUDAS
*Director of the United States Patent and Trademark Office*